(12) United States Patent
Fujita et al.

(10) Patent No.: US 9,221,201 B2
(45) Date of Patent: Dec. 29, 2015

(54) METHOD FOR MANUFACTURING COMPOSITE MATERIAL

(71) Applicant: Mitsubishi Heavy Industries, Ltd., Tokyo (JP)

(72) Inventors: Takeshi Fujita, Tokyo (JP); Kentaro Shindo, Tokyo (JP); Nozomu Kawasetsu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 170 days.

(21) Appl. No.: 13/908,654

(22) Filed: Jun. 3, 2013

(65) Prior Publication Data

US 2014/0027960 A1   Jan. 30, 2014

Related U.S. Application Data

(63) Continuation of application No. PCT/JP2011/075245, filed on Nov. 2, 2011.

(30) Foreign Application Priority Data

Dec. 8, 2010   (JP) .................. 2010-273641

(51) Int. Cl.
| | |
|---|---|
| *B29C 43/12* | (2006.01) |
| *B29C 43/36* | (2006.01) |
| *B29C 70/44* | (2006.01) |
| *B29K 105/08* | (2006.01) |

(52) U.S. Cl.
CPC ............. *B29C 43/12* (2013.01); *B29C 43/3642* (2013.01); *B29C 70/443* (2013.01); *B29C 2043/3644* (2013.01); *B29C 2043/3647* (2013.01); *B29K 2105/0872* (2013.01)

(58) Field of Classification Search
None
See application file for complete search history.

(56) References Cited

U.S. PATENT DOCUMENTS 3,042,574 A * 7/1962 Hochberg ................ 156/286
3,321,019 A * 5/1967 Dmitroff et al. ......... 416/229 R
(Continued)

FOREIGN PATENT DOCUMENTS

| JP | 2162016 A | 6/1990 |
|---|---|---|
| JP | 3166922 A | 7/1991 |
| JP | 10296864 A | 11/1998 |

(Continued)

OTHER PUBLICATIONS

International preliminary report on patentability and written opinion issued Jun. 20, 2013 corresponds to PCT/JP2011/075245.

(Continued)

*Primary Examiner* — Monica Huson
(74) *Attorney, Agent, or Firm* — Kanesaka, Berner & Partners (57) ABSTRACT

A reinforced fiber base material is placed on a forming die having a concave part and fixed to the forming die by at least a pair of fixing members disposed on either side of the concave part so as to form a gap between the reinforced fiber base material and a bottom surface of the concave part of the forming die. Subsequently, the reinforced fiber base material fixed to the forming die is covered by a bag film, a forming space that is formed between the forming die and the bag film is decompressed, and a matrix resin is allowed to flow inside the decompressed forming space. The matrix resin is then hardened so as to obtain a composite material in which the reinforced fiber base material and the matrix resin are integrally formed.

10 Claims, 4 Drawing Sheets

(56) References Cited

U.S. PATENT DOCUMENTS

2006/0249877 A1 11/2006 Kaneko
2008/0023867 A1* 1/2008 Kieffer .......................... 264/102

FOREIGN PATENT DOCUMENTS

| JP | 2002172630 A | 6/2002 |
| JP | 3815848 B2 | 6/2006 |
| JP | 2009220577 A | 10/2009 |
| JP | 2010115837 A | 5/2010 |

OTHER PUBLICATIONS

International Search report dated Jan. 24, 2012.
Decision to Grant a Patent mailed Apr. 22, 2014, corresponds to Japanese patent application No. 2010-273641.

* cited by examiner

METHOD FOR MANUFACTURING COMPOSITE MATERIAL

RELATED APPLICATIONS

The present application is a Continuation of International Application Number PCT/JP2011/075245, filed Nov. 2, 2011, and claims priority from Japanese Application Number 2010-273641, filed Dec. 8, 2010.

TECHNICAL FIELD

The present invention relates to a method for manufacturing a composite material that is used as a member of a wind turbine blade, an airplane, an automobile, a marine vessel, a railroad vehicle, and the like.

BACKGROUND ART

In recent years, applications of resin-based composite materials (hereinafter, simply referred to as "composite materials") in which a matrix resin is reinforced by fiber to members of a wind turbine blade, an airplane, an automobile, a marine vessel, a railroad vehicle, and the like have been spreading rapidly due to a significant advantage offered by such composite materials in terms of weight reduction.

A known method for manufacturing a composite material is autoclave molding in which a plurality of sheets of laminated prepreg material is covered by a bag film and pressure-formed by vacuum suction, and further pressurized and thermally cured in an autoclave.

For example, Patent Document 1 describes autoclave molding which prevents wrinkles and undulations from occurring in a composite material by performing molding while applying tension to a unidirectional fiber prepreg. This molding method involves laminating a plurality of sheets of unidirectional fiber prepreg on top of a forming female mold, overlaying a forming upper template on top of the prepreg, holding an end of the unidirectional fiber prepreg with a tension plate fixed to the forming female mold and a holding plate which is placed on top of the tension plate and which presses the prepreg, overlaying a breathable fabric and a bag film on top of the forming upper template, vacuuming an inside of the bag film, and curing the prepreg by applying heat in a state where the prepreg is pressurized.

However, although autoclave molding is capable of producing a tough composite material because the composite material is baked in an autoclave while being pressurized, autoclave molding requires an autoclave which is a large-scale facility and is too expensive for mass production. In particular, with a composite material that is used in large structural members such as a wind turbine blade or a wing of an airplane, manufacturing high-quality products at high productivity becomes a major issue in addition to obvious requisites for material property such as tensile strength as well as fatigue strength and long-term durability.

In consideration thereof, a vacuum impregnation method (VaRTM: Vacuum assisted Resin Transfer Molding) which does not require a large-scale facility is attracting lots of attention. The vacuum impregnation method involves covering a fiber-reinforced base material placed on a forming die with a bag film, vacuuming an inside of the bag film, injecting liquid resin into the bag film, and curing the liquid resin.

For example, Patent Document 2 discloses a vacuum impregnation method in which a reusable and transparent silicone sheet is used as a bag film. With this method, since a thin-walled, transparent silicone sheet is used as the bag film, a weight of the bag film is reduced and, at the same time, the transparency makes a condition of a liquid resin flowing inside the bag film visible. Therefore, since the bag film can be handled with greater ease and an impregnation condition of the resin can be visually confirmed, workability during composite material production can be improved.

Patent Document 1: Japanese Patent Application Laid-open No. 1-110-296864
Patent Document 2: Japanese Patent Application Laid-open No. 2010-115837

However, with the evolution of end products such as wind turbines, airplanes, automobiles, marine vessels, and railroad vehicles, further improvements in strength are desired for composite materials that are used as members in these end products. Therefore, a conventional vacuum impregnation method such as that described in Patent Document 2 may no longer be able to provide composite material with sufficient strength.

For example, with a structural member such as a wind turbine blade, compressive strength is used in static strength design. Therefore, an improvement in compressive strength is desired for composite materials. In this regard, with a conventional vacuum impregnation method such as that described in Patent Document 2, since tension is not applied on fibers during molding, a straightness of the fibers is low and a composite material with high compressive strength cannot be obtained.

In addition, with a conventional vacuum impregnation method such as that described in Patent Document 2, since a force does not act on the fibers in a length direction of the fibers during molding, wrinkles are likely to occur in the fibers and may cause a decline in the strength of the composite material.

DISCLOSURE OF THE INVENTION

The present invention has been made in consideration of the circumstances described above, and an object thereof is to provide a method for manufacturing a composite material which is capable of producing a high-strength composite material.

A method for manufacturing a composite material according to the present invention is a method for manufacturing a composite material constituted by a fiber-reinforced matrix resin by using a vacuum impregnation method, the method comprising: a fixing step of placing a reinforced fiber base material on a forming die having a concave part and fixing the reinforced fiber base material to the forming die by at least a pair of fixing members disposed on either side of the concave part; a covering step of covering, with a bag film, the reinforced fiber base material fixed to the forming die; a decompressing step of decompressing a forming space formed between the forming die and the bag film; a flowing step of allowing the matrix resin to flow inside the decompressed forming space; and a curing step of curing the matrix resin so as to obtain a composite material in which the reinforced fiber base material and the matrix resin are integrally formed, wherein in the fixing step, the reinforced fiber base material is fixed to the forming die by the fixing members in a state where a gap is provided between the reinforced fiber base material and a bottom surface of the concave part of the forming die.

In this method for manufacturing a composite material, after fixing a reinforced fiber base material to a forming die by at least a pair of fixing members disposed on either side of a concave part of the forming die in a state where a gap is provided between the reinforced fiber base material and a bottom surface of the concave part of the forming die, an inside of a forming space is decompressed. Therefore, during decompression of the inside of the forming space, the reinforced fiber base material is pressed against the concave part of the forming die due to differential pressure between atmospheric pressure and pressure inside the forming space. At this point, since the reinforced fiber base material is fixed by the fixing members, tension is applied to the reinforced fiber base material between the fixing members. Therefore, a straightness of fibers constituting the reinforced fiber base material is increased and a compressive strength of a composite material is improved. In addition, since tension is applied to the reinforced fiber base material, wrinkles of the fibers constituting the reinforced fiber base material are reduced and a decline in the strength of the composite material attributable to wrinkles in the fibers can be suppressed.

Furthermore, since the tension applied to the reinforced fiber base material during forming is generated using a decompressing step that is performed during forming in a vacuum impregnation method, a mechanism for applying tension to the reinforced fiber base material need not be separately provided. Therefore, an increase in facility cost can be suppressed.

Moreover, in the method for manufacturing a composite material described above, the "reinforced fiber base material" may be a base material constituted by dry fibers that are not impregnated by resin or a prepreg in which fibers are impregnated by resin.

In the method for manufacturing a composite material described above, favorably, the concave part of the forming die is provided across an entire product area of the composite material.

Accordingly, a surface area increases over which pressure (the differential pressure between atmospheric pressure and the pressure inside the forming space) that presses the reinforced fiber base material against the concave part of the forming die acts, and greater tension is applied to the reinforced fiber base material during forming. Therefore, the straightness of fibers that constitute the reinforced fiber base material can be dramatically increased to significantly improve the compressive strength of the composite material. At the same time, wrinkles of the fibers that constitute the reinforced fiber base material can be reliably reduced to further suppress a decline in the strength of the composite material that is attributable to wrinkles of the fibers.

Alternatively, in the method for manufacturing a composite material described above, the concave part of the forming die may only be provided outside the product area of the composite material.

In the method for manufacturing a composite material described above, in the covering step, a pressurizing jig may be interposed between the bag film and the reinforced fiber base material, above the concave part provided on the forming die.

In this manner, by providing a pressurizing jig between the bag film and the reinforced fiber base material, above the concave part of the forming die, since the pressurizing jig moves downward due to the differential pressure between atmospheric pressure and the pressure inside the forming space during forming, the reinforced fiber base material is pressed against the concave part of the forming die with greater force. Therefore, the straightness of fibers that constitute the reinforced fiber base material can be dramatically increased to significantly improve the compressive strength of the composite material. At the same time, wrinkles of the fibers that constitute the reinforced fiber base material can be reliably reduced to further suppress a decline in the strength of the composite material that is attributable to wrinkles of the fibers.

In the method for manufacturing a composite material described above, favorably, each of the fixing members includes a fixing bolt that is inserted into a through hole provided through the reinforced fiber base material, and the through hole is provided outside a product area of the composite material.

In this manner, by fixing the reinforced fiber base material to the forming die with a fixing bolt inserted into a through hole, the reinforced fiber base material can be securely fixed and tension can be reliably applied to the fibers that constitute the reinforced fiber base material. Moreover, since the through hole is provided outside the product area of the composite material, the through hole provided through the reinforced fiber base material does not affect the quality of the composite material.

In the method for manufacturing a composite material described above, the reinforced fiber base material may be a base material in which a fiber bundle is arranged in one direction, and the fixing members may be disposed on either side of the concave part of the forming die in an arrangement direction of the fiber bundle of the reinforced fiber base material.

When using a reinforced fiber base material in which a fiber bundle is arranged in one direction, applying tension in an arrangement direction of the fiber bundle is effective in improving the strength of the composite material. Therefore, as described above, by providing fixing members on either side of the concave part of the forming die in the arrangement direction of the fiber bundle and fixing the reinforced fiber base material to the forming die with the fixing members, tension in a length direction of the fiber bundle can be applied to the fibers that constitute the reinforced fiber base material and the strength of the composite material can be effectively improved.

In the method for manufacturing a composite material described above, the reinforced fiber base material may be made of carbon fibers.

When the composite material is carbon fiber reinforced plastic (CFRP), a straightness of carbon fibers has a major influence on compressive strength. In this regard, in the method for manufacturing a composite material described above, since the reinforced fiber base material (carbon fibers) is pressed against the concave part of the forming die and tension is applied to the carbon fibers during forming, the straightness of the carbon fibers is increased and the compressive strength of the carbon fiber reinforced plastic can be significantly improved.

According to the present invention, after fixing a reinforced fiber base material to a forming die by at least a pair of fixing members disposed on either side of a concave part of the forming die in a state where a gap is provided between the reinforced fiber base material and a bottom surface of the concave part of the forming die, an inside of a forming space is decompressed. Therefore, the reinforced fiber base material is pressed against the concave part of the forming die due to differential pressure between atmospheric pressure and pressure inside the forming space, and tension is applied to the reinforced fiber base material between the fixing members. As a result, a straightness of fibers constituting the reinforced fiber base material is increased and a compressive strength of a composite material is improved. In addition, since tension is applied to the reinforced fiber base material, wrinkles of the fibers constituting the reinforced fiber base material are reduced and a decline in the strength of the composite material attributable to wrinkles in the fibers can be suppressed.

Furthermore, since the tension applied to the reinforced fiber base material during forming is generated using a decompressing step that is performed during forming in a vacuum impregnation method, a mechanism for applying tension to the reinforced fiber base material need not be separately provided. Therefore, an increase in facility cost can be suppressed.

BEST MODE FOR CARRYING OUT THE INVENTION

Hereinafter, embodiments of the present invention will be described with reference to the accompanying drawings. However, unless otherwise noted, dimensions, material, shapes, relative arrangements, and the like of components described in these embodiments are merely illustrative examples and are not intended to limit the scope of the present invention.

First Embodiment

Figure 1A:
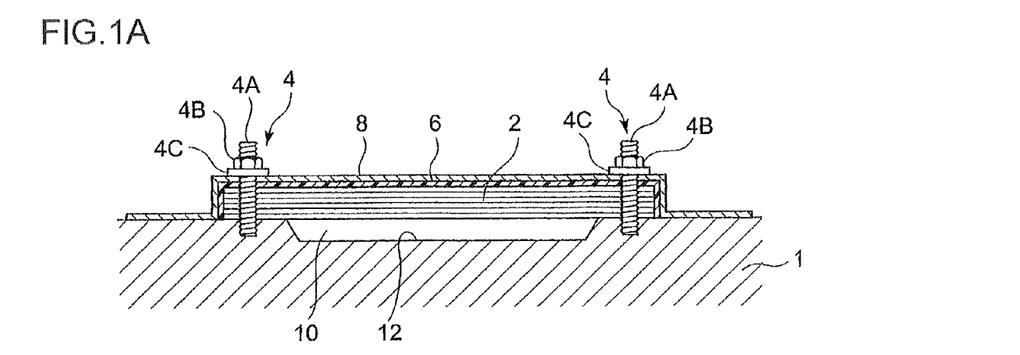
FIG. 1A is a diagram showing a procedure of a method for manufacturing a composite material according to a first embodiment.
Figure 1B:
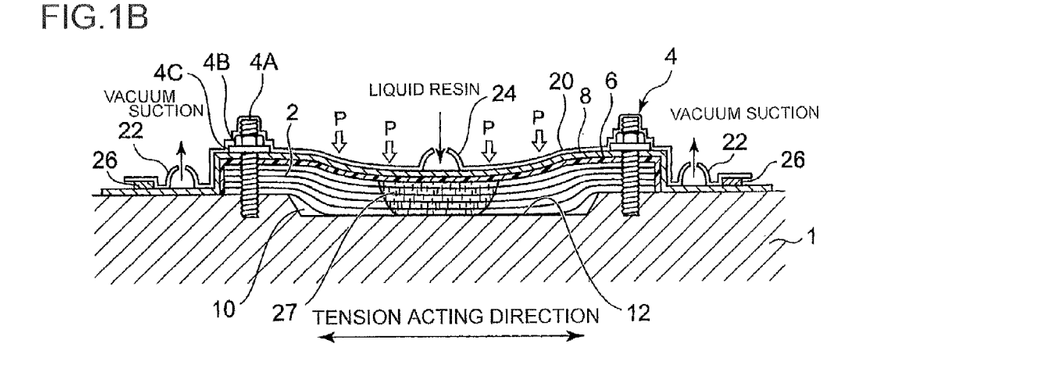
FIG. 1B is a diagram showing a procedure of a method for manufacturing a composite material according to a first embodiment.
Figure 1C:
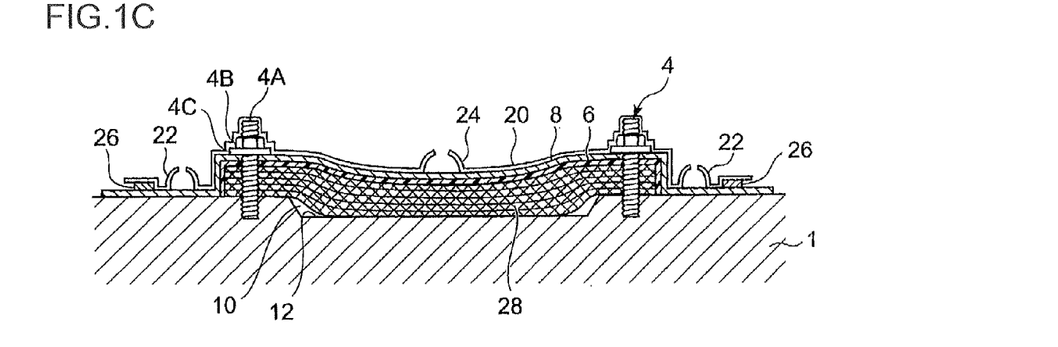
FIG. 1C is a diagram showing a procedure of a method for manufacturing a composite material according to a first embodiment.
Figure 2:
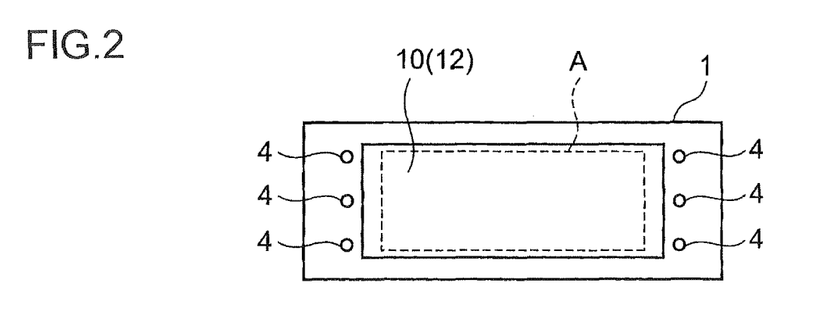
FIG. 2 is an upper view showing a relationship between a concave part of a forming die used in the first embodiment and a product area of the composite material.

A method for manufacturing a composite material according to a first embodiment will be described. FIG. 1 is a diagram showing a procedure of a method for manufacturing a composite material according to the first embodiment. FIG. 2 is an upper view showing a relationship between a concave part of a forming die used in the first embodiment and a product area of the composite material.

First, as shown in FIG. 1A, a reinforced fiber base material 2 that is a base material constituted by dry fibers that have not been impregnated by resin is placed on a forming die 1, and the reinforced fiber base material 2 is fixed to the forming die 1 by a plurality of fixing members 4. In this case, the number of the fixing members 4 are not limited to any particular number as long as there is at least a pair of the fixing members 4, and may be appropriately set according to a size of the reinforced fiber base material 2, a surface area of a concave part 10 of the forming die 1, or the like.

Moreover, at this point, a release sheet (peel ply) 6 and a resin-diffusing reticular sheet (flow medium) 8 are favorably arranged in this order on top of the reinforced fiber base material 2. The release sheet 6 ensures that a composite material 28 (refer to FIG. 1C) can be easily removed after forming. In addition, the resin-diffusing reticular sheet 8 promotes penetration of a matrix resin (to be described later) into the reinforced fiber base material 2.

The forming die 1 has a concave part 10 between the pair of fixing members 4. In addition, the reinforced fiber base material 2 is fixed to the forming die 1 by the fixing members 4 in a state where a gap is provided between the reinforced fiber base material 2 and a bottom surface 12 of the concave part 10 of the forming die 1. At this point, the reinforced fiber base material 2 is favorably fixed to the forming die 1 while pulling both ends of the reinforced fiber base material 2 so as to prevent deflection of the reinforced fiber base material 2.

As shown in FIG. 2, the concave part 10 is provided so as to extend across an entire product area A of a composite material. Accordingly, a surface area increases over which pressure (differential pressure between atmospheric pressure and pressure inside a forming space) that presses the reinforced fiber base material 2 against the concave part 10 of the forming die 1 acts, and greater tension can be applied to the reinforced fiber base material 2 during forming.

Moreover, when the concave part 10 of the forming die 1 is provided across the entire product area A of a composite material, a desired shape of the composite material 28 (refer to FIG. 1C) can be obtained by appropriately adjusting a shape of the concave part 10 of the forming die 1. For example, a depth of the concave part 10 of the forming die 1 can be determined so that a lower surface of the reinforced fiber base material 2 comes into contact with the bottom surface 12 of the concave part 10 during decompression inside the forming space (to be described later) and, at the same time, the bottom surface 12 of the concave part 10 may be given an inverted shape of an ultimately desired shape of the composite material 28.

As fibers that constitute the reinforced fiber base material 2, known fibers such as carbon fiber, aramid fiber, and glass fiber can be used. Moreover, when the reinforced fiber base material 2 is made of carbon fibers, a straightness of the carbon fibers has a major influence on compressive strength. Therefore, by adopting the method for manufacturing a composite material according to the present embodiment, a significant effect of improving the compressive strength of a composite material (CFRP) can be enjoyed.

Although the fixing members 4 are not particularly limited as long as the fixing members 4 are able to fix the reinforced fiber base material 2, fixing bolts that are inserted into through holes provided through the reinforced fiber base material 2 may be used.

Moreover, when fixing bolts that are inserted into through holes provided through the reinforced fiber base material 2 are used as the fixing members 4, the fixing members 4 are disposed outside the product area A of the composite material as shown in FIG. 2. Therefore, the through holes of the reinforced fiber base material 2 into which the fixing members 4 are inserted are also provided outside the product area A. Therefore, the through holes provided through the reinforced fiber base material 2 do not have any influence on a quality of the composite material 28 (refer to FIG. 1C).

For example, as shown in FIG. 1A, the fixing member 4 may be constituted by a stud 4A, a nut 4B, and a pressure plate 4C. With the stud 4A, one end thereof is screwed to the forming die 1, a center part thereof is inserted into a through hole provided through the reinforced fiber base material 2, the release sheet 6, and the resin-diffusing reticular sheet 8, and the nut 4B is screwed to another end of the stud 4A. The pressure plate 4C is provided between the nut 4B and the resin-diffusing reticular sheet 8, and a fastening power created by the nut 4B is transferred to the reinforced fiber base material 2 via the pressure plate 4C and enables the reinforced fiber base material 2 to be securely fixed. Therefore, tension can be reliably applied to fibers that constitute the reinforced fiber base material 2.

Moreover, in the example shown in FIG. 1A, after the stud 4A is attached to the forming die 1, the stud 4A is inserted into a through hole provided in advance through respective fiber sheets that constitute the reinforced fiber base material 2 so as to form the reinforced fiber base material 2 by laminating the respective fiber sheets, and by further inserting the stud 4A into a through hole provided through the release sheet 6 and the resin-diffusing reticular sheet 8 and fastening the stud 4A with the nut 4B via the pressure plate 4C, the reinforced fiber base material 2 is fixed to the forming die 1.

In addition, when the fiber bundle of the reinforced fiber base material 2 is arranged in a single direction, the fixing members 4 are favorably disposed on either side of the concave part 10 in an arrangement direction of the fiber bundle of the reinforced fiber base material 2. By providing fixing members 4 on either side of the concave part 10 of the forming die 1 in the arrangement direction of the fiber bundle and fixing the reinforced fiber base material 2 to the forming die 1 with the fixing members 4, tension in a length direction of the fiber bundle can be applied to the fibers that constitute the reinforced fiber base material 2 and the strength of the composite material can be effectively improved.

After fixing the reinforced fiber base material 2 to the forming die 1 with the fixing members 4, as shown in FIG. 1B, the reinforced fiber base material 2 is covered by a bag film 20, an inside of the bag film 20 is decompressed, and a liquid matrix resin is injected into the bag film 20.

Specifically, the reinforced fiber base material 2 is covered by the bag film 20 provided with a suction port 22 and a fill port 24, and a space (a forming space) enclosed by the bag film 20 and the forming die 1 is sealed by a sealing member 26. A vacuum pump is then connected to the suction port 22 and the inside of the forming space is decompressed by the vacuum pump. Furthermore, a liquid matrix resin is injected into the decompressed forming space via the fill port 24. Moreover, reference numeral 27 in FIG. 1B denotes a region of the reinforced fiber base material 2 that is penetrated by the matrix resin.

When the inside of the forming space is decompressed, a differential pressure P between atmospheric pressure and pressure inside the forming space causes the reinforced fiber base material 2 to be pressed against the concave part 10 of the forming die 1. At this point, since the reinforced fiber base material 2 is fixed by the fixing members 4, tension in an arrow direction as shown in FIG. 1B is applied to the reinforced fiber base material 2 between the fixing members 4. Therefore, upon injection of the matrix resin, fibers that constitute the reinforced fiber base material 2 are in a state where straightness is increased and wrinkles are reduced.

Moreover, the matrix resin may be a thermosetting resin such as unsaturated polyester, epoxy resin, polyamide resin, and phenolic resin or a thermoplastic resin as typified by polybutylene terephthalate. When a thermoplastic resin is used as the matrix resin, the matrix resin is melted and then injected into the forming space so as to penetrate into the reinforced fiber base material 2.

Subsequently, as shown in FIG. 1C, the matrix resin is hardened so as to obtain the composite material 28 in which the reinforced fiber base material 2 and the matrix resin are integrally formed. Specifically, if the matrix resin is a thermosetting resin, the matrix resin is hardened by a reaction under a heated condition or a room temperature condition. On the other hand, if the matrix resin is a thermoplastic resin, the melted matrix resin is cooled and solidified.

Subsequently, the composite material 28 is taken out from the forming die 1 and cut to the size of the product area A.

As described above, a method for manufacturing a composite material according to the present embodiment comprises: a fixing step of placing a reinforced fiber base material 2 on a forming die 1 having a concave part 10 and fixing the reinforced fiber base material 2 to the forming die 1 by at least a pair of fixing members 4 disposed on either side of the concave part 10; a covering step of covering, with a bag film 20, the reinforced fiber base material 2 fixed to the forming die 1; a decompressing step of decompressing a forming space formed between the forming die 1 and the bag film 20; a flowing step of allowing a matrix resin to flow inside the decompressed forming space; and a curing step of curing the matrix resin so as to obtain a composite material 28 in which the reinforced fiber base material 2 and the matrix resin are integrally formed, wherein in the fixing step, the reinforced fiber base material 2 is fixed to the forming die 1 by the fixing members 4 in a state where a gap is provided between the reinforced fiber base material 2 and a bottom surface 12 of the concave part 10 of the forming die 1.

According to the present embodiment, after fixing a reinforced fiber base material 2 to a forming die 1 by at least a pair of fixing members 4 disposed on either side of a concave part 10 of the forming die 1 in a state where a gap is provided between the reinforced fiber base material 2 and a bottom surface 12 of the concave part 10 of the forming die 1, an inside of a forming space is decompressed. Therefore, the reinforced fiber base material 2 is pressed against the concave part 10 of the forming die 1 due to differential pressure P between atmospheric pressure and pressure inside the forming space, and tension is applied to the reinforced fiber base material 2 between the fixing members 4. As a result, a straightness of fibers constituting the reinforced fiber base material 2 is increased and a compressive strength of a composite material 28 is improved. In addition, since tension is applied to the reinforced fiber base material 2, wrinkles of the fibers constituting the reinforced fiber base material 2 are reduced and a decline in the strength of the composite material 28 attributable to wrinkles in the fibers can be suppressed.

Furthermore, since the tension applied to the reinforced fiber base material 2 during forming is generated using a decompressing step that is performed during forming in a vacuum impregnation method, a mechanism for applying tension to the reinforced fiber base material 2 need not be separately provided. Therefore, an increase in facility cost can be suppressed.

Second Embodiment

Figure 3A:
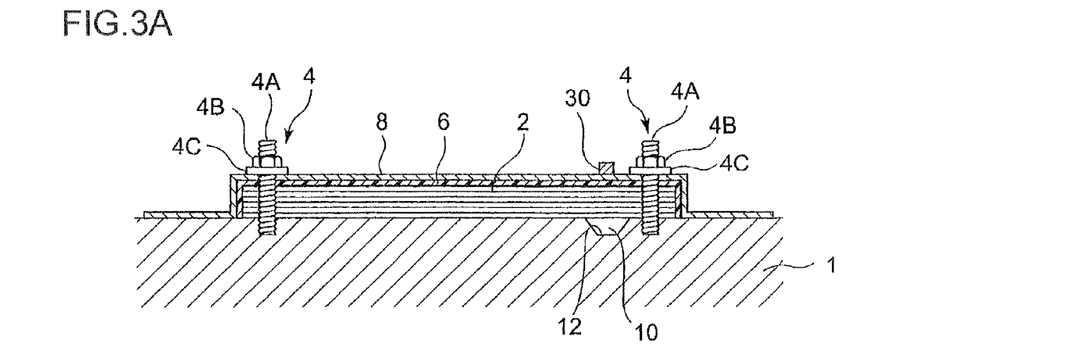
FIG. 3A is a diagram showing a procedure of a method for manufacturing a composite material according to a second embodiment.
Figure 3B:
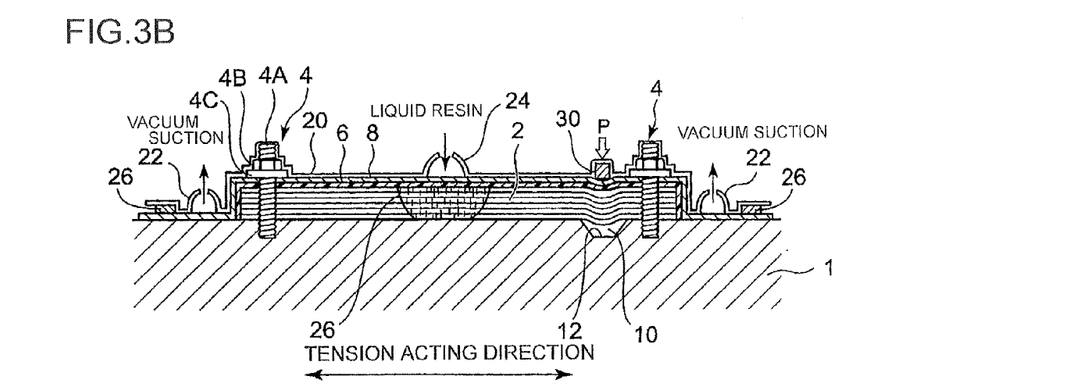
FIG. 3B is a diagram showing a procedure of a method for manufacturing a composite material according to a second embodiment.
Figure 3C:
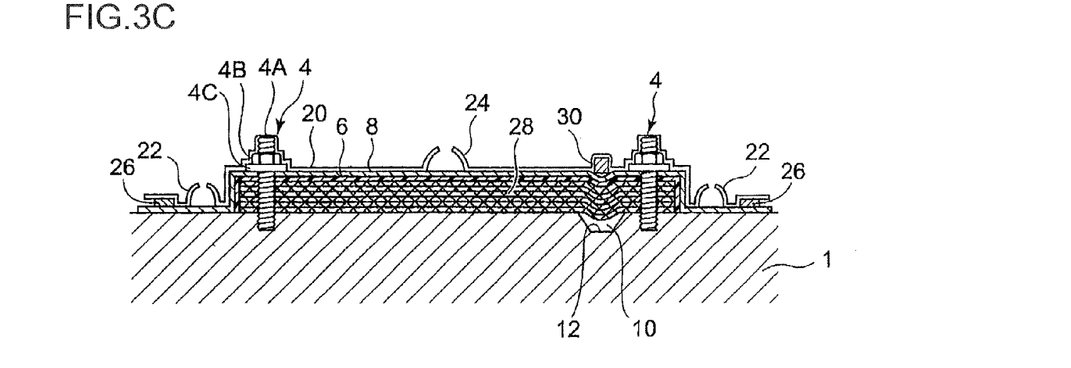
FIG. 3C is a diagram showing a procedure of a method for manufacturing a composite material according to a second embodiment.
Figure 4:
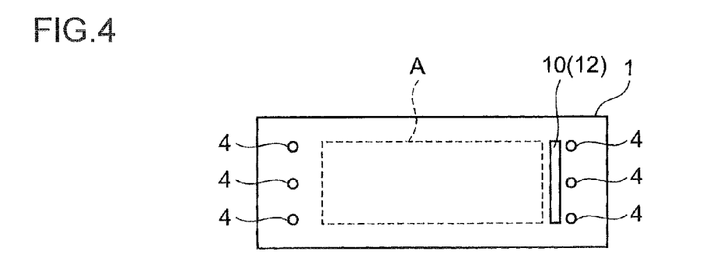
FIG. 4 is an upper view showing an example of a relationship between a concave part of a forming die used in the second embodiment and a product area of the composite material.
Figure 5:
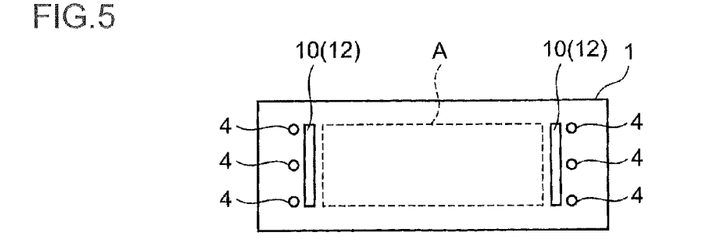
FIG. 5 is an upper view showing another example of a relationship between a concave part of a forming die used in the second embodiment and a product area of the composite material.

Next, a method for manufacturing a composite material according to a second embodiment will be described. FIG. 3 is a diagram showing a procedure of a method for manufacturing a composite material according to the second embodiment. FIG. 4 is an upper view showing an example of a relationship between a concave part of a forming die used in the second embodiment and a product area of the composite material. FIG. 5 is an upper view showing another example of a relationship between the concave part of the forming die and a product area of the composite material.

Moreover, the method for manufacturing a composite material according to the present embodiment is similar to that of the first embodiment with the exception of providing the concave part 10 of the forming die 1 outside of a product area of the composite material and providing a pressurizing jig. Therefore, members in common with the first embodiment will be denoted by the same reference characters and description of contents in common with the first embodiment will be omitted. Instead, the following description will focus on differences from the first embodiment.

First, as shown in FIG. 3A, a reinforced fiber base material 2 is placed on a forming die 1, and the reinforced fiber base material 2 is fixed to the forming die 1 by a plurality of fixing members 4. At this point, a gap is provided between the reinforced fiber base material 2 and a bottom surface 12 of a concave part 10 of the forming die 1.

Although the forming die 1 used in the present embodiment is similar to that of the first embodiment in having the concave part 10 between a pair of fixing members 4, as shown in FIG. 4, the forming die 1 used in the present embodiment differs from that of the first embodiment in having the concave part 10 provided outside of a product area A of a composite material. Moreover, from a perspective of applying greater tension to the reinforced fiber base material 2, as shown in FIG. 5, concave parts 10 may be provided on either side of the product area A of a composite material.

In addition, a pressurizing jig 30 is placed on top of a resin-diffusing reticular sheet 8 above the concave part 10 provided on the forming die 1.

The pressurizing jig 30 may be made of any material such as aluminum, iron, steel, wood, and resin. Although the pressurizing jig 30 is basically intended to press the reinforced fiber base material 2 against the concave part 10 of the forming die 1 by moving downward due to differential pressure between atmospheric pressure and pressure inside a forming space during forming, the pressurizing jig 30 may alternatively be constituted by a heavy material so that the reinforced fiber base material 2 is pressed against the concave part 10 by the own weight of the pressurizing jig 30 in addition to the differential pressure. When the pressurizing jig 30 is constituted by a heavy material, favorably, a weight of the pressurizing jig 30 is adjusted so as not to obstruct penetration of a matrix resin into the reinforced fiber base material 2 around the pressurizing jig 30.

Subsequently, as shown in FIG. 3B, the reinforced fiber base material 2 is covered by a bag film 20, an inside of the bag film 20 is decompressed, and a liquid matrix resin is injected into the bag film 20. At this point, the pressurizing jig 30 is interposed between the bag film 20 and the reinforced fiber base material 2 above the concave part 10 provided on the forming die 1.

In this manner, by interposing the pressurizing jig 30 between the bag film 20 and the reinforced fiber base material 2 above the concave part 10 of the forming die 1, since the pressurizing jig moves downward due to the differential pressure between atmospheric pressure and the pressure inside the forming space during forming, the reinforced fiber base material 2 is pressed against the concave part 10 of the forming die 1 with greater force.

Therefore, even if the concave part 10 of the forming die 1 has a small surface area, large tension in the direction of an arrow shown in FIG. 3B can be applied to the reinforced fiber base material 2. As a result, the straightness of fibers that constitute the reinforced fiber base material 2 can be dramatically increased to significantly improve a compressive strength of the composite material 28 (refer to FIG. 3C). At the same time, wrinkles of the fibers that constitute the reinforced fiber base material 2 can be reliably reduced to further suppress a decline in the strength of the composite material 28 that is attributable to wrinkles of the fibers.

In particular, since the concave part 10 of the forming die 1 is provided outside of the product area A of the composite material in the present embodiment, by applying large tension to the reinforced fiber base material 2 at the concave part 10 with a small surface area using the pressurizing jig 30, not only can material costs be reduced but downsizing of a forming device (such as the forming die 1) can also be achieved.

Subsequently, as shown in FIG. 3C, the matrix resin is hardened so as to obtain the composite material 28 in which the reinforced fiber base material 2 and the matrix resin are integrally formed, and the obtained composite material 28 is taken out of the forming die 1 and cut to the size of the product area A.

Moreover, favorably, the pressurizing jig 30 is provided at a distance from a fill port 24 through which the matrix resin is injected. This is because having the pressurizing jig 30 and the fill port 24 too close to each other may cause the pressure inside the forming space to increase around the pressurizing jig 30 due to the injection of the matrix resin through the fill port 24 and may lower the differential pressure between atmospheric pressure and the pressure inside the forming space, resulting in an inability to apply sufficient tension to the reinforced fiber base material 2.

Third Embodiment

Next, a method for manufacturing a composite material according to a third embodiment will be described. The method for manufacturing a composite material according to the present embodiment is similar to that of the first embodiment with the exception of using a prepreg in which fibers are impregnated with resin as the reinforced fiber base material 2. Therefore, description of contents in common with the first embodiment will be omitted and differences from the first embodiment will be mainly described below.

Figure 6:
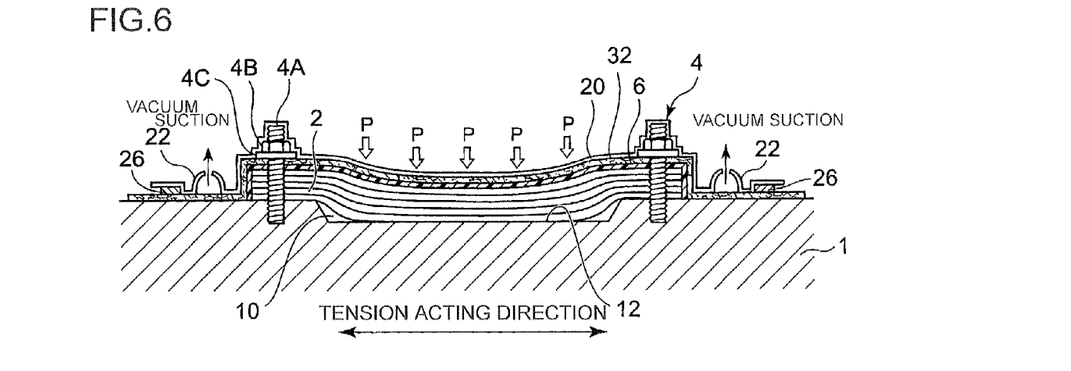
FIG. 6 is a diagram showing how a composite material is manufactured using a reinforced fiber base material formed of prepregs.

FIG. 6 is a diagram showing how a composite material is manufactured using the reinforced fiber base material 2 formed of prepregs. As shown in FIG. 6, the reinforced fiber base material (prepregs) 2 is heated to fluidize resin while an inside of a forming space is being decompressed using a vacuum pump (not shown) connected to a suction port 22 of a bag film 20.

Moreover, in the present embodiment, injection of a matrix resin is not performed since the reinforced fiber base material 2 formed of prepregs is used. Therefore, a fill port for resin injection is not provided on the bag film 20. In addition, a breather (breathable fabric) 32 (refer to FIG. 6) is provided in place of a resin-diffusing reticular sheet 8 for promoting penetration of a matrix resin into the reinforced fiber base material 2.

When the inside of the forming space is decompressed, differential pressure P between atmospheric pressure and pressure inside the forming space causes the reinforced fiber base material 2 to be pressed against a concave part 10 of a forming die 1. At this point, since the reinforced fiber base material 2 is fixed by fixing members 4, tension in a direction of an arrow shown in FIG. 5 is applied to the reinforced fiber base material 2 between the fixing members 4. Therefore, upon heating of the reinforced fiber base material (prepregs) 2, fibers that constitute the reinforced fiber base material 2 are in a state where straightness is increased and wrinkles are reduced. Consequently, a compressive strength of a composite material can be increased and a decline in the strength of the composite material 28 attributable to wrinkles in the fibers can be suppressed without using an autoclave.

While embodiments of the present invention have been described using specific terms, it is to be understood that the present invention is not limited thereto and various improvements and modifications may be made without departing from the spirit and scope of the present invention.

For example, while examples where the composite material 28 has a flat plate shape have been described in the above embodiments, the composite material 28 may alternatively take any shape including a curved shape.

In addition, the embodiments described above may be suitably combined with each other. For example, even when the concave part 10 is provided across the entire product area A of the composite material 28 as is the case with the first and third embodiments, the pressurizing jig 30 may be interposed between the bag film 20 and the reinforced fiber base material 2 above the concave part 10 of the forming die 1 from a perspective of applying greater tension to the reinforced fiber base material 2.

The invention claimed is:

1. A method for manufacturing a composite material constituted by a fiber-reinforced matrix resin by using a vacuum impregnation method, the method comprising:
    a fixing step of placing a reinforced fiber base material on a forming die having a concave part and fixing the reinforced fiber base material to the forming die by at least a pair of fixing members disposed on either side of the concave part;
    a covering step of covering, with a bag film, the reinforced fiber base material fixed to the forming die;
    decompressing step of decompressing a forming space formed between the forming die and the bag film;
    a flowing step of allowing the matrix resin to flow inside the decompressed forming space; and
    a curing step of curing the matrix resin so as to obtain a composite material in which the reinforced fiber base material and the matrix resin are integrally formed, wherein
    in the fixing step, the reinforced fiber base material is fixed to the forming die by the fixing members in a state where a gap is provided between the reinforced fiber base material and a bottom surface of the concave part of the forming die, and
    in the decompression step, the reinforced fiber base material is deformed by being pressed towards the forming die due to differential pressure between atmospheric pressure and pressure inside the forming space, and said gap becomes smaller.

2. The method for manufacturing a composite material according to claim 1, wherein the concave part of the forming die is provided across an entire product area of the composite material.

3. The method for manufacturing a composite material according to claim 1, wherein the concave part of the forming die is only provided outside a product area of the composite material.

4. The method for manufacturing a composite material according to claim 1, wherein in the covering step, a pressurizing jig is interposed between the bag film and the reinforced fiber base material, above the concave part provided on the forming die.

5. The method for manufacturing a composite material according to claim 1, wherein
    each of the fixing members includes a fixing bolt that is inserted into a through hole provided through the reinforced fiber base material, and
    the through hole is provided outside a product area of the composite material.

6. The method for manufacturing a composite material according to claim 1, wherein
    the reinforced fiber base material is a base material in which a fiber bundle is arranged in one direction, and
    the fixing members are disposed on either side of the concave part of the forming die in an arrangement direction of the fiber bundle of the reinforced fiber base material.

7. The method for manufacturing a composite material according to claim 1, wherein the reinforced fiber base material is made of carbon fibers.

8. The method for manufacturing a composite material according to claim 1, wherein said composite material is a wind turbine blade.

9. The method for manufacturing a composite material according to claim 1, wherein said composite material is a member of an airplane, an automobile, a marine vessel, or a railroad vehicle.

10. A method for manufacturing a composite material constituted by a fiber-reinforced matrix resin by using a vacuum impregnation method, the method comprising:
    a fixing step of placing a reinforced fiber base material on a forming die having a concave part and fixing the reinforced fiber base material to the forming die by at least a pair of fixing members disposed on either side of the concave part;
    a covering step of covering, with a bag film, the reinforced fiber base material fixed to the forming die;
    decompressing step of decompressing a forming space formed between the forming die and the bag film;
    a flowing step of allowing the matrix resin to flow inside the decompressed forming space; and
    a curing step of curing the matrix resin so as to obtain a composite material in which the reinforced fiber base material and the matrix resin are integrally formed, wherein
    in the fixing step, the reinforced fiber base material is fixed to the forming die by the fixing members in a state where a gap is provided between the reinforced fiber base material and a bottom surface of the concave part of the forming die, and
    in the fixing step, the reinforced fiber base material is fixed to the forming die by the fixing members in a state where a gap is provided between at least a part of a bottom surface of the reinforced fiber base material and a bottom surface of the concave part of the forming die located immediately below the reinforced fiber base material.

* * * * *